(12) United States Patent
Shu et al.

(10) Patent No.: US 7,039,551 B2
(45) Date of Patent: May 2, 2006

(54) METHOD AND APPARATUS FOR CALCULATING AN OPERATOR DISTRACTION LEVEL

(75) Inventors: David Shu, West Hills, CA (US); David Schwartz, Moorpark, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/256,098

(22) Filed: Sep. 25, 2002

(65) Prior Publication Data

US 2003/0149545 A1 Aug. 7, 2003

Related U.S. Application Data

(60) Provisional application No. 60/354,452, filed on Feb. 4, 2002.

(51) Int. Cl.
*G06F 17/00* (2006.01)

(52) U.S. Cl. .................. 702/182; 702/188; 702/189; 340/439; 340/576; 701/45; 701/48; 701/301

(58) Field of Classification Search .................. 702/33, 702/57, 113, 150, 176, 182, 183, 188, 189, 702/177; 701/45, 48, 57, 62, 93, 98, 120, 701/301, 35, 36; 340/435, 439, 438, 576, 340/679, 680
See application file for complete search history.

(56) References Cited

U.S. PATENT DOCUMENTS

| | | | | |
|---|---|---|---|---|
| 5,224,566 A | * | 7/1993 | Stepanian et al. | 180/272 |
| 5,344,324 A | * | 9/1994 | O'Donnell et al. | 434/258 |
| 5,642,467 A | * | 6/1997 | Stover et al. | 700/250 |
| 5,745,031 A | * | 4/1998 | Yamamoto | 340/439 |
| 5,801,667 A | * | 9/1998 | Shimizu et al. | 345/7 |
| 5,978,737 A | * | 11/1999 | Pawlowski et al. | 701/301 |
| 6,185,514 B1 | * | 2/2001 | Skinner et al. | 702/188 |

(Continued)

OTHER PUBLICATIONS

Thomas A. Dingus and Melissa C. HulseJonathan F. AntinWalter W. Wierwille, "Attentional demand requirements of an automobile moving-map navigation system." Transportation Research Part A, vol. 23, Issue 4, pp. 301-315 (Jul. 1989).

*Primary Examiner*—Hal Wachsman
*Assistant Examiner*—Jeffrey R West
(74) *Attorney, Agent, or Firm*—Tope-McKay & Associates (57) ABSTRACT

A method, apparatus, and computer program product are provided for calculating an indicator of operator distraction for an equipment operator. First, distraction-correlated indicator information from devices around an operator is received. Next, a distraction level is estimated. Subsequently, an output is produced indicative of the distraction level to facilitate a threat assessment decision. Additional operations may include grouping information into complex task types comprising sets of related activities. Next, an elapsed time is determined since the start of the first activity in a complex task. The delay since the most recent activity in the complex task is compared with a minimum task quiescent period. When the delay exceeds the minimum task quiescent period, the elapsed time and the delay are reset. Also, during the performance of a complex task, the type and the elapsed time of the complex task are correlated with other information to facilitate a threat assessment decision.

39 Claims, 10 Drawing Sheets

U.S. PATENT DOCUMENTS

| | | | |
|---|---|---|---|
| 6,263,282 B1 * | 7/2001 | Vallancourt | 701/301 |
| 6,580,973 B1 * | 6/2003 | Leivian et al. | 701/1 |
| 6,675,130 B1 * | 1/2004 | Kanevsky et al. | 702/188 |
| 2002/0091473 A1 * | 7/2002 | Gardner et al. | 701/35 |
| 2002/0128751 A1 * | 9/2002 | Engstrom et al. | 701/1 |
| 2003/0004615 A1 * | 1/2003 | Hagelin | 701/1 |

* cited by examiner

Radio, & HVAC controls

Distraction, $D^{(R)}$ & $D^{(H)}$:
(NONE, LOW, MED, HIGH)

$t_{1st}^{(H)}$ & $t_{1st}^{(R)}$

| | Duration - $\tau^{(R)}$ & $\tau^{(H)}$ | | | |
|---|---|---|---|---|
| | long | normal | short | off | fault |
| off | LOW | LOW | LOW | NONE | NONE |
| weak | MED | MED | LOW | NONE | NONE |
| medium | MED | HIGH | MED | LOW | NONE |
| strong | MED | HIGH | HIGH | MED | NONE |

(a)

Radio & HVAC controls

Confidence, $C^{(R)}$ & $C^{(H)}$:
(NONE, LOW, MED, HIGH)

$t_{1st}^{(H)}$ & $t_{1st}^{(R)}$

| | Duration - $\tau^{(R)}$ & $\tau^{(H)}$ | | | |
|---|---|---|---|---|
| | long | normal | short | off | fault |
| off | HIGH | MED | LOW | HIGH | NONE |
| weak | MED | MED | MED | LOW | NONE |
| medium | MED | HIGH | HIGH | LOW | NONE |
| strong | MED | HIGH | HIGH | MED | NONE |

| Turn Signal | Duration - $\tau^{(T)}$ | | | |
|---|---|---|---|---|
| | long | normal | short | off | fault |
| Distraction, $D^{(T)}$: (NONE, LOW, MED, HIGH) | MED | HIGH | HIGH | NONE | NONE |
| Confidence, $C^{(T)}$: (NONE, LOW, MED, HIGH) | MED | HIGH | HIGH | MED | NONE |

Figure 6 (b) - Confidence Factor (percent)

Figure 6 (a) - Driver Distraction level (percent)

METHOD AND APPARATUS FOR CALCULATING AN OPERATOR DISTRACTION LEVEL

PRIORITY CLAIM

This application claims the benefit of priority to provisional application 60/354,452, titled Information "Driver Distraction Level", filed with the United States Patent and Trademark Office on Feb. 4, 2002.

TECHNICAL FIELD

The present invention relates generally to automotive safety and more specifically to collision warning systems based upon driver distraction levels.

BACKGROUND OF THE INVENTION

According to reports by the U.S. National Highway Traffic Safety Administration, an estimated 20% of all reported automobile crashes each year involve some form of driver distraction. Thus, there has been significant interest recently regarding the issue of driver distraction, as well as concerns that many of the telematic features being planned for automobiles may lower their safety through increased driver distraction. How to measure driver distraction, how to model driver cognitive workload, and how to predict distractive effects are all open, important research issues.

Actions such as pushing a button or adjusting a knob often require the driver to glance away from the roadway in order to accurately locate the button or knob, e.g., to adjust the heating system or to change radio stations. While the driver is glancing away to perform the secondary task, the driver's attention to the primary task of driving the vehicle is distracted, and thus secondary tasks are associated with an increased driver distraction level.

Because of the high level of danger associated with driver distraction, it would be desirable to provide a system that utilizes measures of driver distraction derived from driver manipulation of controls within a vehicle to adjust various parameters of the vehicle in order to account for the driver's lack of attention to driving. It would be further desirable to provide a system that may be applied in situations beyond driving to those involving operators of various types of equipment such as manufacturing or process-related equipment.

SUMMARY OF THE PRESENT INVENTION

In a first aspect, the present invention provides a method, an apparatus, and a computer program product for calculating an indicator of operator distraction for an equipment operator. In a method aspect, the invention comprises a step of receiving distraction-correlated indicator information regarding the operator from devices around an operator. After the receiving step, the invention performs a step of estimating a distraction level from the information. Subsequently, a step is performed for producing an output indicative of the distraction level in order to facilitating a threat assessment decision.

In a further aspect, in the step of producing an output, the output produced ensures that when the distraction of the operator is high, the threat assessment decision is made conservatively.

In a still further aspect, the activity information is received from at least one device selected from the group comprising vision-based sensing systems, range-finding systems, and operator-manipulated devices.

In a yet further aspect, the present invention further comprises a step of grouping the activity information into complex task types comprising sets of related activities. Subsequently, a step is performed for determining an elapsed time since the start of the first activity in a complex task. Next, a step of determining the delay time since the most recent activity in the complex task is performed. Next, the delay since the most recent activity is compared with a minimum task quiescent period, and when the delay exceeds the minimum task quiescent period, resetting the elapsed time and the delay. During the performance of a complex task, the type and the elapsed time of the complex task are compared with other information in order to produce the output for facilitating the threat assessment decision.

In a still further aspect, in the receiving step, the activity information includes a duration of a current activity.

In a further aspect, the step of correlating is performed by a controller selected from the group consisting of fuzzy rule-based controllers and rule-based controllers.

In another aspect, in the step of receiving operator activity information, the activity information is based on secondary activities performed by the operator of a vehicle.

In an additional aspect, the present invention further comprises a step of adjusting the operational parameters of the vehicle to accommodate the driver's distraction.

In a still further aspect, in the step of adjusting the operational parameters of the vehicle, the operational parameters adjusted are collision warning system parameters.

In yet another aspect, in the step of receiving operator activity information, the activity information is based on secondary activities performed by the operator of equipment selected from a group consisting of manufacturing equipment and process control equipment.

In another aspect, the present invention further comprises a step of adjusting the operational parameters of the equipment to accommodate the operator's distraction.

Each of the steps of the method discussed above typically corresponds to operations of a software or hardware module for performing the function. In other embodiments, the steps may be incorporated onto a computer readable medium to provide a computer program product. Also, the steps discussed above also correspond to means in an apparatus for calculating an indicator of operator distraction for an equipment operator.

BRIEF DESCRIPTION OF THE DRAWINGS

The objects, features and advantages of the present invention will be apparent from the following detailed descriptions of the various aspects of the invention in conjunction with reference to the following drawings.

DETAILED DESCRIPTION

The present invention relates generally to equipment operation safety and more specifically to collision warning systems based upon driver distraction levels. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, it is useful to provide a centralized location in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more clearly explaining the terms used.

Complex task: A complex task is a task that involves multiple manipulations of various objects (multiple performances of simple tasks). For example, to tune a radio to a particular station, a user must first turn on the radio (simple task 1), adjust the station (simple task 2), and adjust the volume (simple task 3). Because these simple tasks belong to the same overall operation, the overall operation is referred to as a complex task. The overall time required to perform a complex task is measured from the start of the first individual task or control activation until a "quiescent" period has passed since the most recent individual task or control activation has ended. The time required to complete a complex task is referred to as the elapsed time, and the threshold "quiescent" period that signals the end of a complex task is referred to as the minimum task quiescent period.

Control activation: A control activation is the performance of a single task. For example, turning on the radio in a car is considered a single control activation. Control activations range from those involving a relatively instantaneous action such as flipping a switch to those involving a longer action such as turning a knob or depressing a button for a period of time. The length of time it takes to complete control activation is referred to as an activation time.

Distraction-correlated indicator information: Distraction-correlated indicator information is information regarding an operator that may be correlated with a level of distraction. Optimally, this type of information would be derived directly from the operator's brain function. Generally, however, this type of information is derived from indirect sources such as the operator's physical motions such as eye movements, body position, or other body movements as well as from the operator's manipulation of various objects in their surroundings in the performance of secondary activities.

Equipment—This term is used to indicate any equipment, where the effective operation of the equipment is a desired goal. For example, equipment may be an automobile such as a car or truck, another type of vehicle such as a boat or an airplane, or equipment may be another type of equipment, such as manufacturing equipment, etc.

Primary activity: Primary activities are those considered critical for the proper performance of the task an operator is attempting to accomplish. For example, in the case of a vehicle, driving is considered the primary task.

Secondary activity: Secondary activities are those considered non-critical or auxiliary to the primary activity. Secondary activities require the shifting of attention away from primary activities. For example, adjusting the heating system of a vehicle is not critical to the driver's ability to drive, but it requires that attention be taken away from the primary activity of driving, increasing the likelihood of collision.

Simple task: A simple task is the performance of a simple control activation.

Threat assessment decision: A threat assessment decision is a decision made in automatic response to a particular circumstance. For example, if a the driver of an automobile is swerving, a warning may sound in order to alert the driver that he or she may be driving recklessly. In another example, as a car gets very close to another vehicle, a warning may sound to alert the driver to avoid a potential collision. The output of the present invention is used to provide information to such systems to assist in the threat assessment decision in order to determine whether to warn the driver of potential danger. For example, if the level of driver distraction was considered to be HIGH and the confidence in the measure of distraction was MEDIUM to HIGH, the system may react more conservatively, e.g. signaling a potential collision earlier. The system may be adjusted to match various driver profiles. For example, a driver who enjoys driving aggressively could adjust the system so that activities that would normally cause the system to warn a less aggressive driver would not cause a warning for the more aggressive driver. As a result, the system can be tailored to the driving style of a particular user.

(2) Physical Aspects

The present invention has three principal "physical" aspects. The first is a system for determining operator distraction, typically in the form of a computer system operating software or in the form of a "hard-coded" instruction set. This system may be incorporated into various, devices such as a vehicular warning system, and may be coupled with a variety of sensors that provide information regarding an operator's distraction level. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

Figure 1:
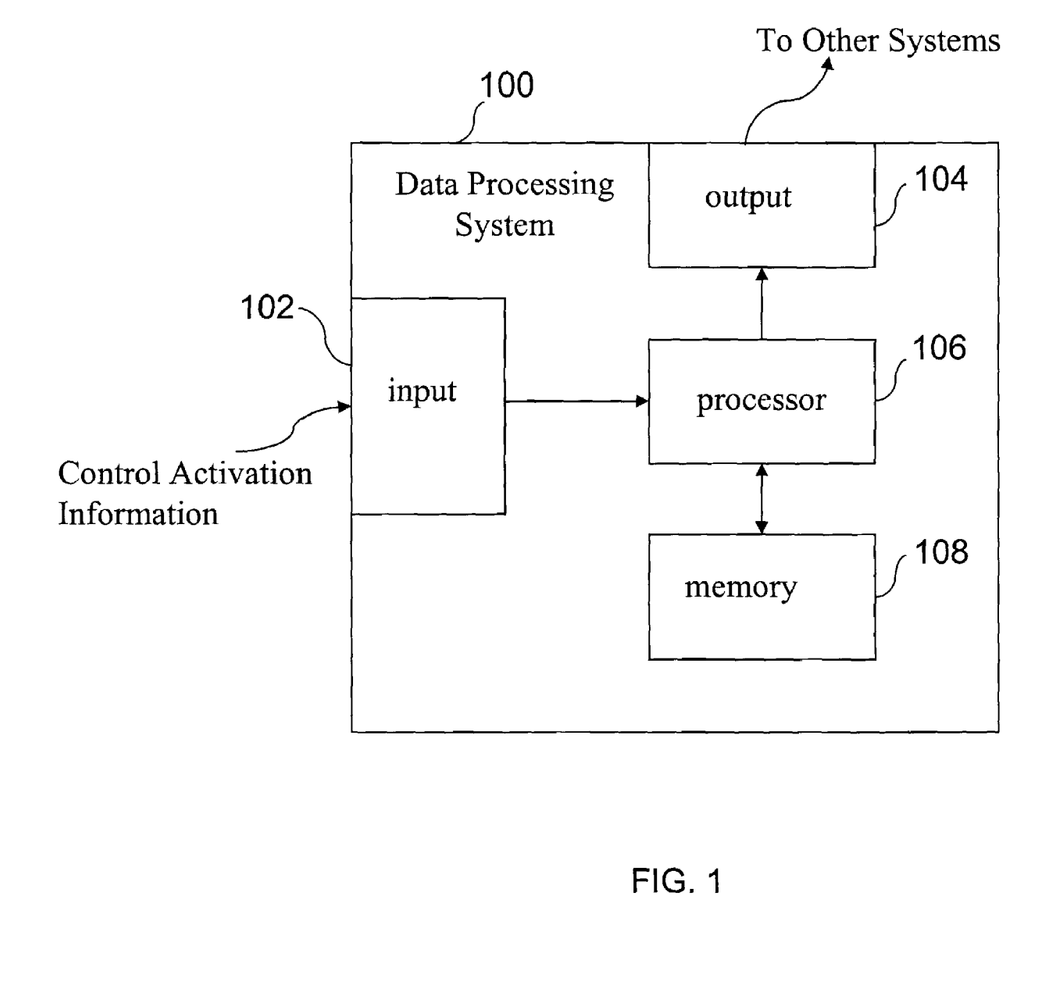
FIG. 1 is a block diagram depicting the components of a computer system used in the present invention.

A block diagram depicting the components of a computer system used in the present invention is provided in FIG. 1. The data processing system 100 comprises an input 102 for information to be used in inferring the level of driver distraction from at least one sensor. Note that the input 102 may include multiple "ports". Typically, input is received from sensors embedded within controls (e.g., buttons and knobs) on and around machinery controlled by an operator, but may also be received from other means such as range-finding and vision-based sensors. The output 104 is connected with the processor 106. Output is provided to other systems in order to augment their response to take into account the level of operator distraction (e.g., to vary when a collision-avoidance warning will occur in a car). Output may also be provided to other devices or other programs, e.g. to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
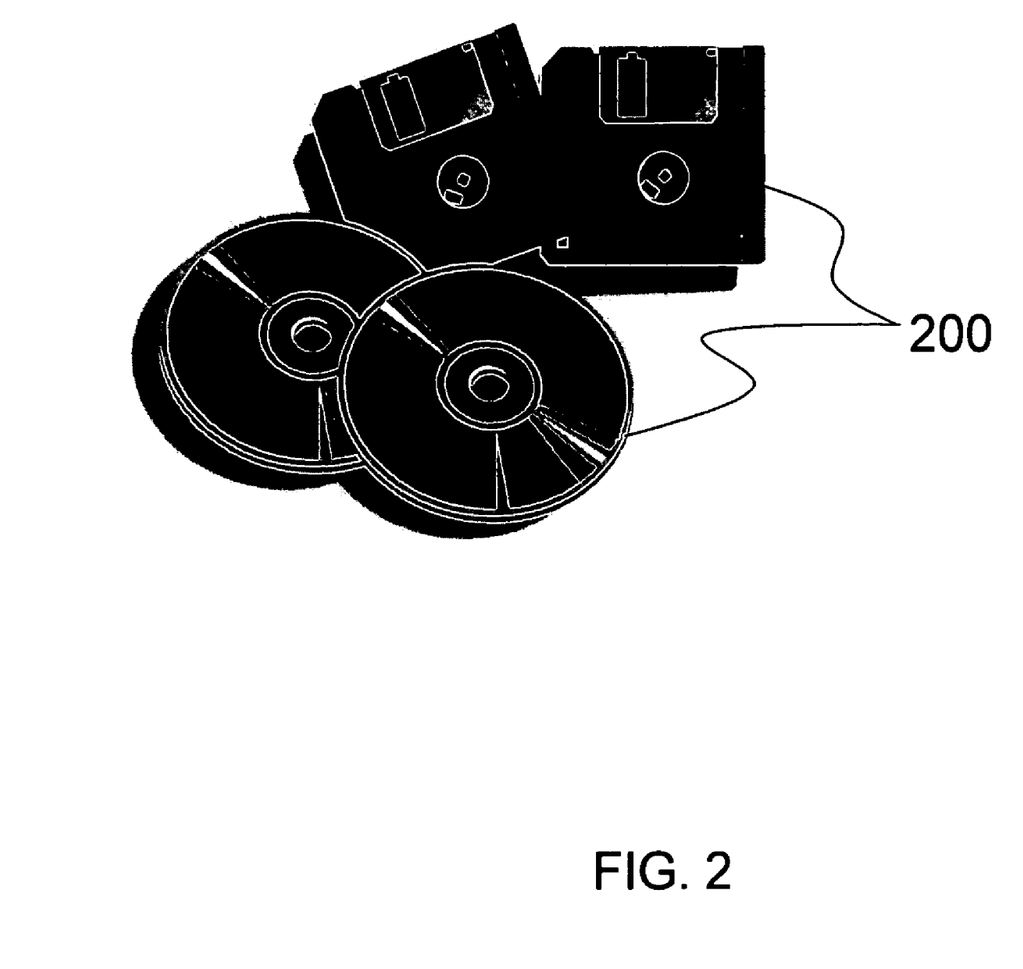
FIG. 2 is an illustrative diagram of a computer program product aspect of the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Discussion

The present invention provides a mechanism for generating an indication of operator distraction, and more particularly for measuring the level of distraction of vehicle drivers. Specifically, a technique for estimating an operator's distraction level for tasks that involve glancing away from the vehicle's forward path is presented. It may be based on fuzzy logic rules for estimating the distraction level due to pressing buttons, turning knobs, etc. Such actions are often parts of multi-action complex tasks and, as such, provide predictive information regarding near-term distraction levels. The present invention is described herein in the context of its application for drivers of motor vehicles, but a wide variety of other applications involving the measurement of human distraction by monitoring secondary activities will be readily ascertainable by one of skill in the art. With regard to the application for drivers of motor vehicles, the present invention is particularly beneficial for collision warning systems because it allows for the adjustment of a threat assessment decision.

If the system determines that the driver has a high distraction level with moderate to high confidence in the estimate of the distraction level, then it will make a more "conservative" decision in evaluating the best response to the current threat assessment. If the driver is distracted, they need more time to respond to a potential threat alert in order to take the correct action, so an earlier warning/response is desired. However, if the driver is attentive and has adequate time to respond, it may be better to wait until the threat level increases further before taking a response action. Producing earlier alerts when the driver is attending requires that a threat assessment decision be made with less information. It is also important that the threat assessment system not react prematurely and take a responsive action before a driver would normally respond. Such responses are considered "false alarms" and are perceived as a significant nuisance by the driver. Since different drivers exhibit different response characteristics, it may be desirable to have different warning settings or preferences available to accommodate variations in the normal driving behavior range, e.g., a young male may have a different setting than that of an elderly female. Overall safety is enhanced by producing earlier threat warnings/responses when driver distraction is high.

As may be understood by reference to the glossary above, button pushes and knob adjustments are generally referred to as control activations. A single control activation, not followed by another control activation, is classified as a simple secondary task. Many secondary tasks require multiple action (i.e. multiple button pushes), and are referred to as complex secondary tasks. An example of a complex secondary task is hunting around to find a radio station with a preferred song or type of music.

During a simple task, typically the driver glances to locate the control, activates the control, and then returns their glance to the forward view. Once the control is activated, the amount of remaining distraction to predict is considered insignificant. One difficulty is that a portion of the distraction of the simple secondary task occurs before the event that can be easily measured (i.e. the button push). This lack of predictive capability is not a critical shortcoming because the number of accidents caused by simple tasks has not been found to be significant.

Complex tasks, on the other hand, require multiple control activations and involve eye-hand coordination and/or visual feedback; typically requiring many short sampling glances away from the forward view. It is precisely these complex tasks that are known to increase the risk of accidents. Fortunately, complex tasks do contain significant predictive information about successive glances and control activations.

Data utilized in the examples herein is from Dingus, T. A., Antin, J. F., Julse, M. C., and Wierwille, W. W., "Attentional demand requirements of an automobile moving-map navigation system," *Transportation Research*, 1989, A23(4), 301–315, incorporated herein by reference in its entirety for reference purposes only; without regard to any critical aspect of the present invention. This data characterizes the temporal behavior of complex secondary tasks involved in automobile driving, and separates them into two groups: radio controls, and heating, ventilation, and air-conditioning (HVAC) controls. Complex tasks for each group are characterized by their statistical behavior (i.e., mean and variance). A complex task is defined as a series of control activations followed by a quiescent period. If the amount of elapsed time since the end of the most recent control activation is less than the quiescent period, $T_q$, then the activations are considered to belong to the same complex task. On the other hand, once the quiescent period, $T_q$, has been exceeded, the complex task is considered complete. The driver distraction level of a complex task is modeled as "HIGH" after the first control activation, decaying with elapsed time, and increasing with successive control activations. The degree of driver distraction resulting from each successive control activation within a complex task (when taken alone) is considered to decrease with the total elapsed time, although the total distraction continues to increase.

As the length of time since the first activation of a control within a complex task increases, there is a decreasing degree of future predictability of the driver distraction level. Therefore a second output is modeled, encompassing a decreasing confidence factor.

Various controllers such as a rule-based controllers, analog, and/or digital circuits may be used in the performance of the present invention, as will be readily apparent to one of skill in the art. However, it is desirable that a fuzzy logic-based controller be used, as will be described below. The domain of knowledge regarding complex tasks is incorporated into a set of fuzzy logic rules as follows.

$t_{1st}^{(i)}$ is the elapsed time since the start of the first control activation of a complex task (for group i);

$\tau_{(i)}$ is the duration of the current control activation (for group i). This duration is generally measured by the amount of time a particular button was pushed or knob adjusted; and $T_q^{(i)}$ is the minimum task quiescent period (for group i).

Figure 3:
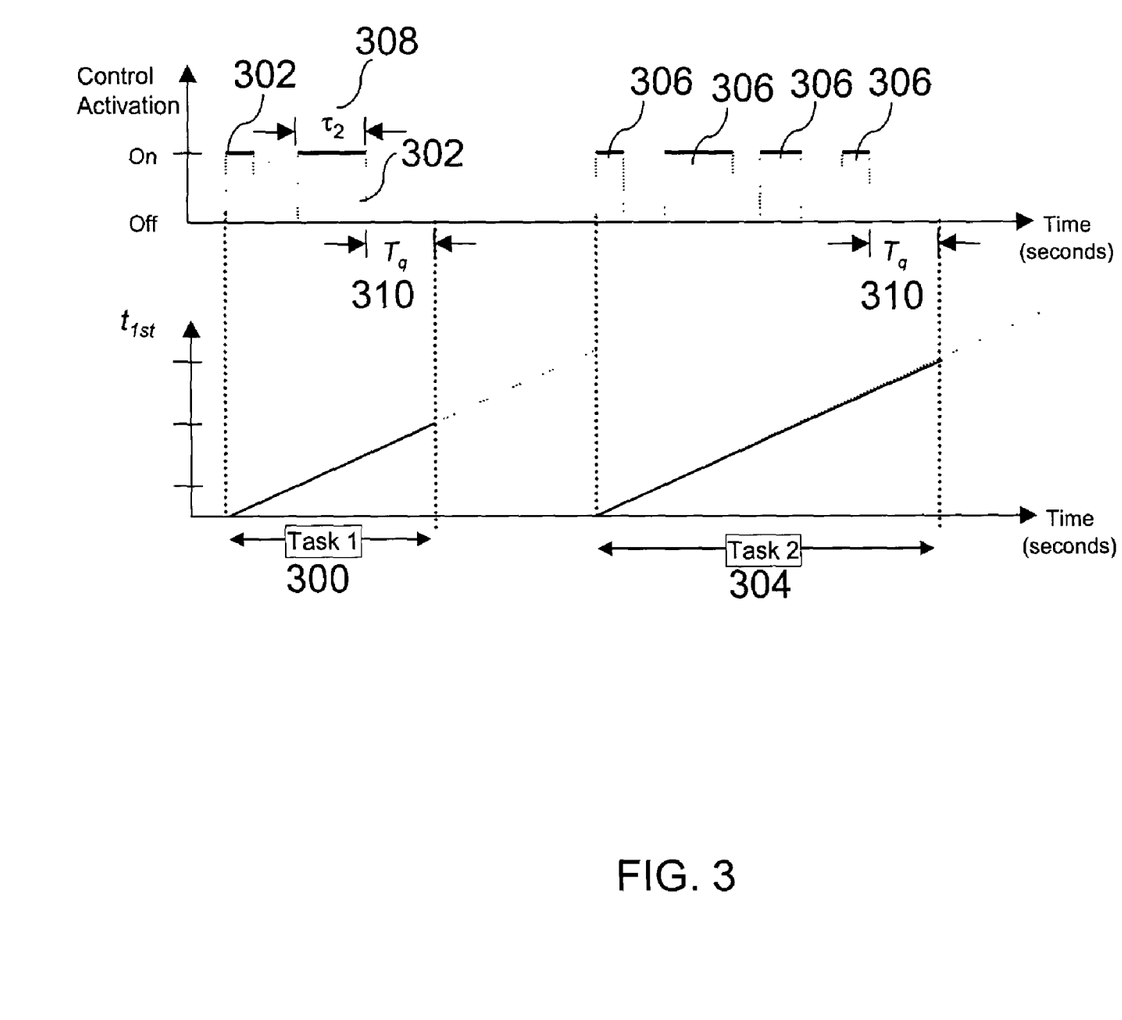
FIG. 3 is a timeline showing the relationship between control activation times and elapsed times for complex tasks.

Timeline diagrams depicting two complex tasks are depicted in FIG. 3. The first task 300 has two control activations 302 and the second task 304 has four control activations 306. As shown, the second control activation of the first task has an activation duration of $\tau_2$ 308.

The controls are separated into groups, each having similar rules, but capturing the different statistics (i.e., mean and variance) of each group. For each group of controls, two inputs are measured: the elapsed task time $t_{1st}^{(i)}$ for each complex task, and the duration $\tau^{(i)}$ for each control activation. These two inputs are then fuzzified and applied to the fuzzy controller.

The complex task is considered complete when the time since the end of the last control activation in group i, exceeds the maximum quiescent period $T_q^{(i)}$ 310, or when the driver takes a particular action that clearly indicates a high attentiveness level. It should be noted that $t_{1st}^{(i)}$ is also reset to zero in this case.

Figure 4:
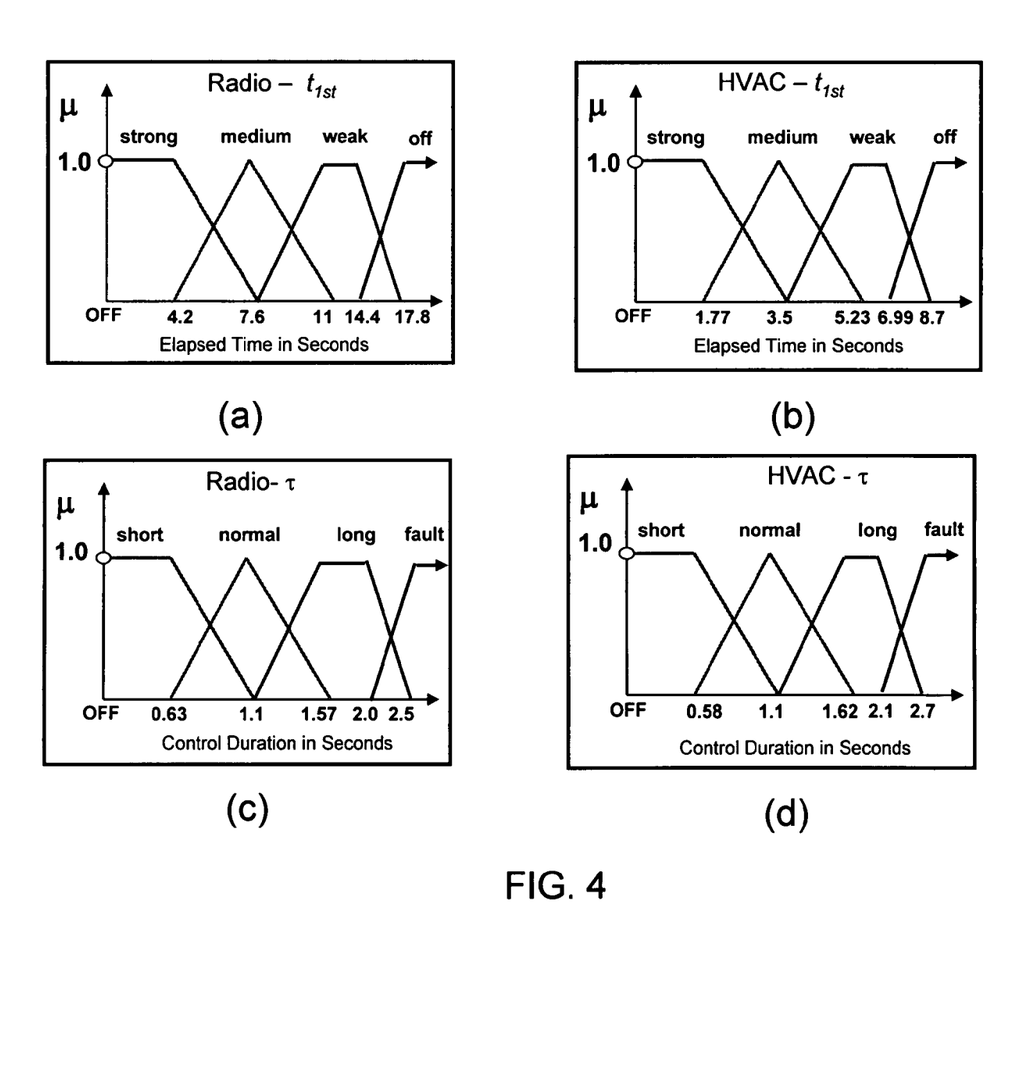
FIG. 4(a) shows the membership functions for the elapsed time of complex radio tasks.
FIG. 4(b) shows the membership functions for the elapsed time of complex heating, ventilation, and air conditioning (HVAC) tasks.
FIG. 4(c) shows the membership functions for the elapsed time of radio control activations (simple tasks)
FIG. 4(d) shows the membership functions for the elapsed time of HVAC control activations (simple tasks)

An example of a desirable fuzzification of the inputs from this set of data is depicted in FIG. 4, where FIG. 4(a) shows the membership functions for the elapsed time of complex radio tasks; FIG. 4(b) shows the membership functions for the elapsed time of complex HVAC tasks; FIG. 4(c) shows the membership functions for the elapsed time of radio control activations (simple tasks); and FIG. 4(d) shows the membership functions for the elapsed time of HVAC control activations (simple tasks). If the elapsed task time, $t_{1st}$, for the radio group is 4.8 seconds, then STRONG has a membership value of $\mu=0.76$, MEDIUM has a membership value of $\mu=0.24$, and WEAK and OFF have membership values of $\mu=0.0$. Similarly, for a radio group, if the control activation has a duration, $\tau=1.4$ seconds, then SHORT has a membership value of $\mu=0.0$, NORMAL has a membership value of $\mu=0.36$, LONG has a membership value of $\mu=0.64$, and FAULT has a membership value of $\mu=0.0$.

In terms of these fuzzy inputs, a set of rules is defined for each group that determines the system outputs: the driver distraction level (D) and the confidence factor (C). The rules for group i are of the form:

$R_1$: If $t_{1st}^{(i)}$ is OFF and $\tau^{(i)}$ is LONG then $D^{(i)}$ is LOW.

$R_n$: If $t_{1st}^{(i)}$ is STRONG and $\tau^{(i)}$ is FAULT then $D^{(i)}$ is NONE.

Figure 5:
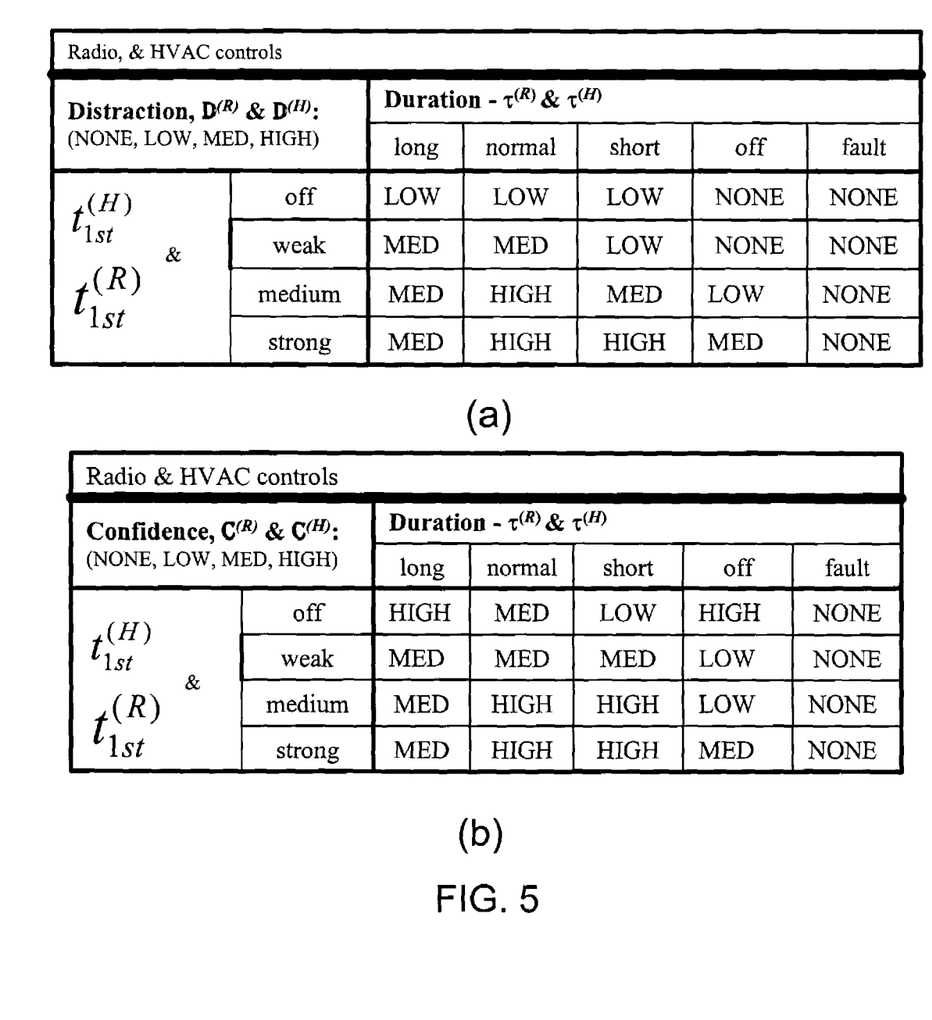
FIG. 5(a) is a table depicting the fuzzification rules for the radio group (R)
FIG. 5(b) is a table depicting the fuzzification rules for the HVAC group (H)
FIG. 5(c) is a table depicting the fuzzification rules for the turn signal group (T)

These statements are represented as a compact table of rules in FIGS. 5(a), (b), and (c) where (R), (H), and (T) are the RADIO, HVAC, and TURN SIGNAL groups respectively. The radio and HVAC groups have identical rules but different fuzzification membership functions as were depicted in FIG. 4. The turn signal does not have a task elapsed time since there are no multiple turn signal complex tasks, only a turning of the signal on and off. The membership function for the turn signal is similar in form to those of the radio and HVAC groups, but has a much longer mean time.

For each group, all of the rules are evaluated to determine the relative contribution of each rule. For the radio group driver distraction level there are 20 rules to evaluate:

$$\mu_{R1}=\min(\mu_{t_{1st}}^1, \mu_\tau^1)$$

. . .

$$\mu_{R20}=\min(\mu_{t_{1st}}^{20}, \mu_\tau^{20}).$$

Recall that rule 1 for this case was:

$R_1$: If $t_{1st}^{(i)}$ is OFF AND $\tau^{(i)}$ is LONG THEN $D^{(i)}$ is LOW

This rule is evaluated by determining the degree of membership of $t_{1st}^{(R)}$ and the degree of membership of $\tau^{(R)}$. There are many possible fuzzy algebras to implement "AND", as will be appreciated by one skilled in the art. For this example, the algebra of the minimum operator for the "AND" or intersection operation is used.

Thus, if at the current time, $t_{1st}^{(R)}=4.8$, and $\tau^{(R)}=1.4$, then membership of OFF, $\mu_{t_{1st}}^1=0$, and the membership of LONG, $\mu_\tau^1=0.64$ (see FIG. 4).

$$\mu_{R1}=\min(\mu_{t_{1st}}^1=0, \mu_\tau^1=0.64)=0$$

The other 89 rules are evaluated in a similar fashion. The distribution of the 90 rules used is depicted below in Table 1.

TABLE 1

|  |  | # of Rules |
|---|---|---|
| Driver Distraction | | |
| | Radio Group | 20 |
| | HVAC Group | 20 |
| | Turn Signal Group | 5 |
| Confidence Factor | | |
| | Radio Group | 20 |
| | HVAC Group | 20 |
| | Turn Signal Group | 5 |
| | | TOTAL=90 |

Figure 6:
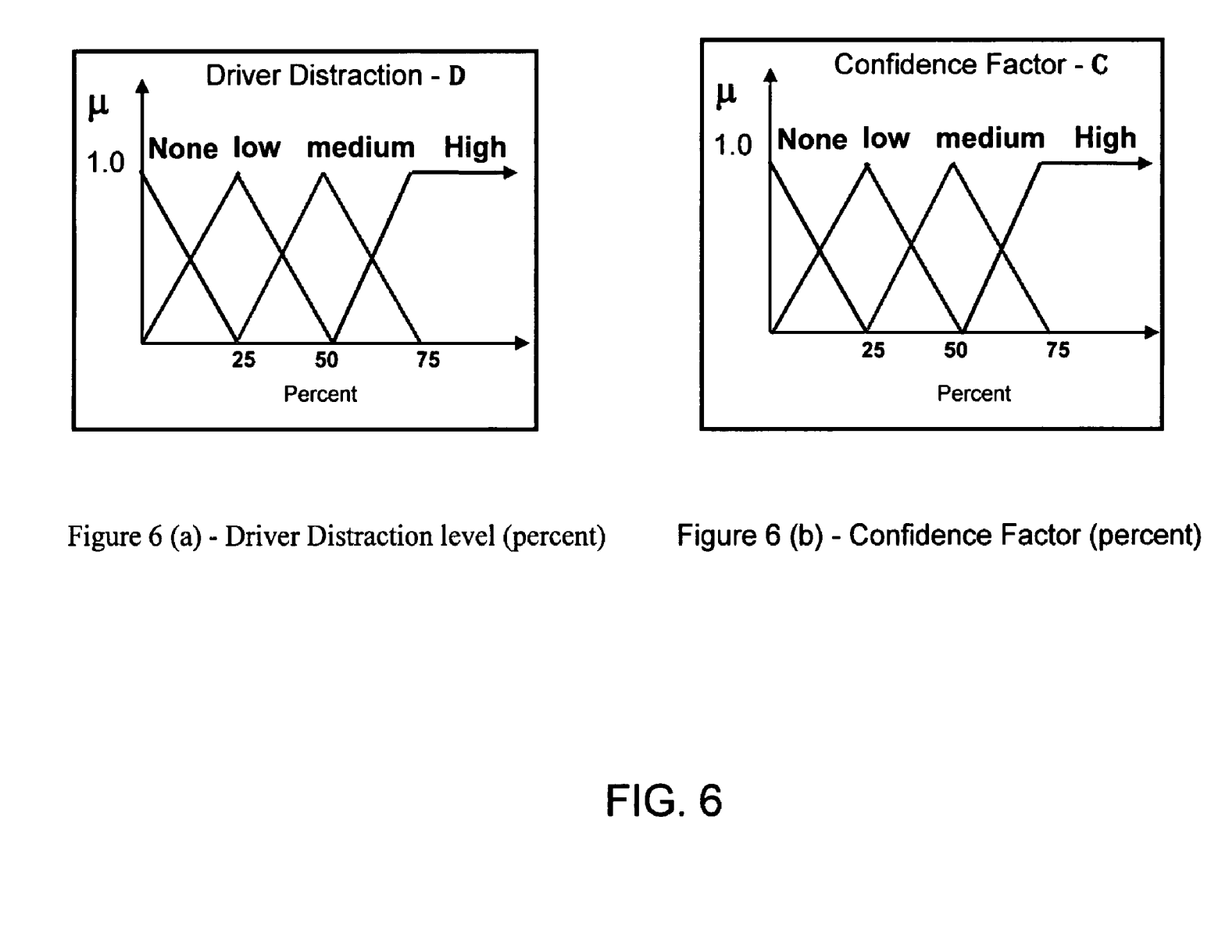
FIG. 6(a) is a graph depicting the membership functions for the varying levels of driver distraction.
FIG. 6(b) is a graph depicting the membership functions for the varying levels of the confidence factor.

The output classification rules are presented next. As with the inputs, membership functions are defined for the outputs. The output functions used in conjunction with the present invention are depicted by the charts shown in FIG. 6, where FIG. 6(a) is a graph depicting the membership functions for the varying levels of driver distraction and FIG. 6(b) is a graph depicting the membership functions for the varying levels of the confidence factor.

Figure 7:
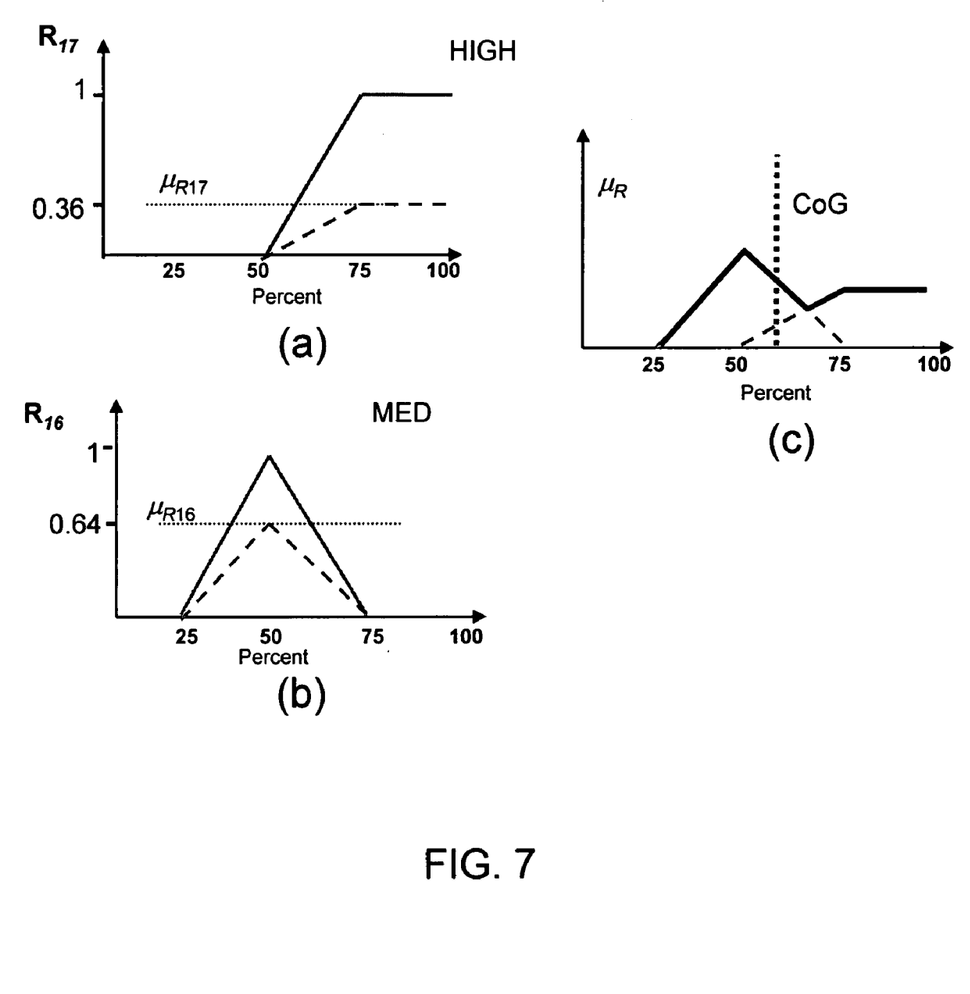
FIG. 7(a) is a graph depicting the relative contribution of HIGH to the combined weighted rule output.
FIG. 7(b) is a graph depicting the relative contribution of MEDIUM to the combined weighted rule output.
FIG. 7(c) is a graph depicting the center of gravity after all of the weighted rule outputs have been combined.

To determine the driver distraction level, D, in this example, the rules are combined as follows (again, note that other fuzzy algebras are possible). For each of the 45 driver distraction rules, the outputs are weighted by their rule membership. For example, if rule 16 and rule 17 were:

R16: If $t_{1st}^{(R)}$ is STRONG AND $\tau^{(R)}$ is LONG THEN $D^{(R)}$ is MEDIUM$\Rightarrow \mu_{R16}=0.64$ and R17: If $t_{1st}^{(R)}$ is STRONG AND $\tau^{(R)}$ is NORMAL THEN $D^{(R)}$ is HIGH$\Rightarrow \mu_{R17}=0.36$, then the combination would include a 0.64 weighted contribution of MEDIUM, a 0.36 weighted contribution of HIGH, and similar corresponding weighted contributions of the other 43 rules. FIG. 7(a) and FIG. 7(b) depict the weighted contributions of HIGH and MEDIUM, respectively.

There are many ways to combine the weighted contributions as will be apparent to one of skill in the art. The combination of the weighted contributions is referred to as a rule connective operation. The connective operation of maximum is used in this example aspect. The maximum of the weighted membership output is computed for all the rules. FIG. 7(c) demonstrates the result of combining rules 12 and 13 via the maximum connective operation. In the figure, only two of the 45 rules are shown in order to avoid cluttering the graph.

After all of the weight rule outputs have been combined, the center of mass of the connected result is determined. The center of mass occurs where there are equal areas under the curve to the left and to the right of the center of gravity (CoG) dividing line [over the range of distraction or confidence, e.g. (0–100)]). In the example depicted in FIG. 7(b), the center of gravity is at 59.6%.

Figure 8:
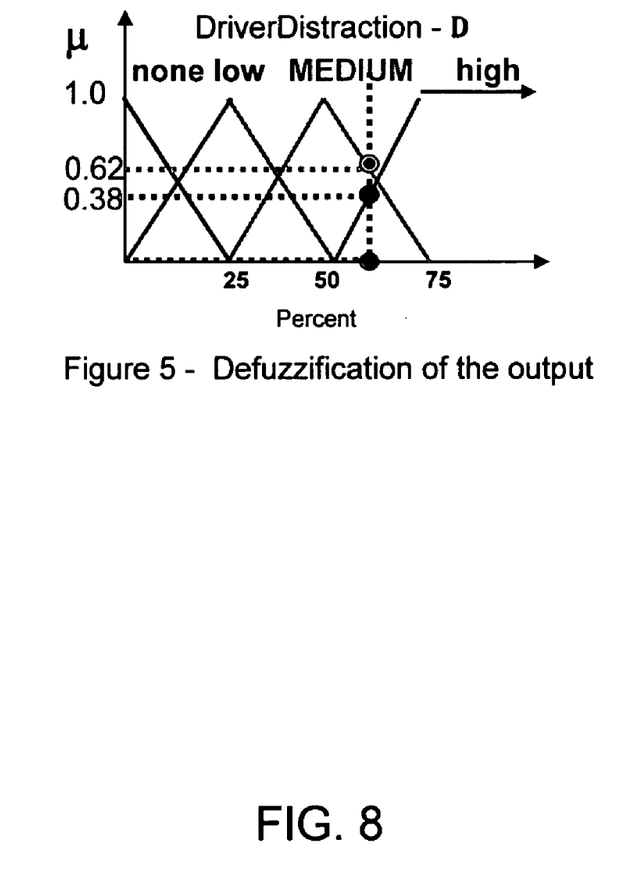
FIG. 8 is a graph depicting the defuzzification of the output of the present invention.

The output is converted into a crisp output (defuzzified) by determining the operator distraction output whose membership is maximum for the value of the center of gravity. With reference to FIG. 8; in this case MEDIUM has the maximum membership of 0.62, so the output driver distraction level, D, is classified as MEDIUM. The same process is applied to compute the output confidence factor, C.

Figure 9:
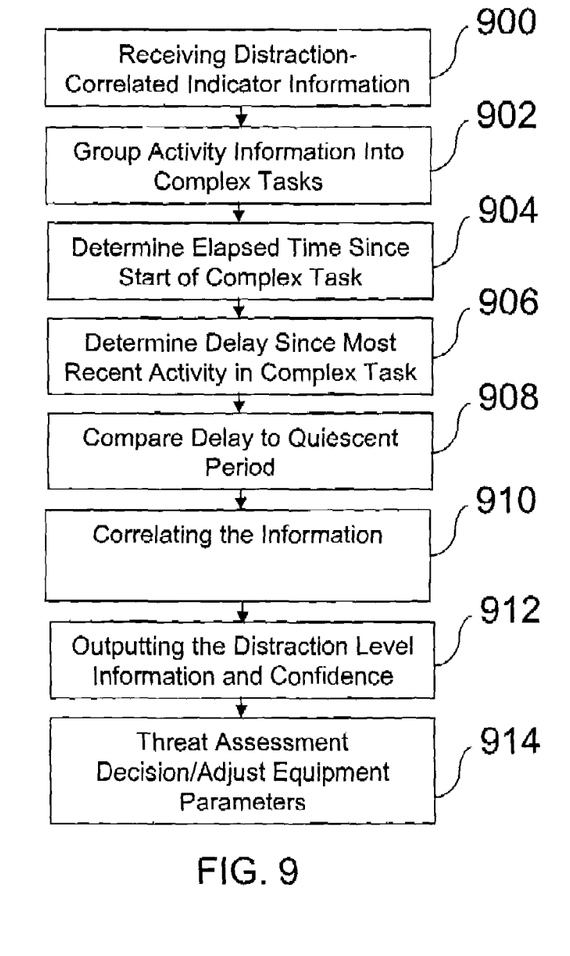
FIG. 9 is a flow chart depicting the steps in the method of the present invention.

A flow chart depicting the steps in a method aspect of the present invention is depicted in FIG. 9. In the first step, distraction-correlated indicator information is received regarding the operator from devices around the operator 900. Depending on its form, the information may then be grouped by type of action into complex tasks 902. This grouping may be performed within the system of the present invention or may take place before the information is inputted. Next, an elapsed time since the start of a complex task is measured 904, and a delay since the most recent activity in the complex task is recorded 906. After each subsequent task in the complex task, the delay is compared to the minimum task quiescent period (which may vary depending on the complex task performed) to determine whether the complex task has been completed 908. If the complex task has been completed, both the elapsed time and the delay are reset. Note that in a limiting case, any individual activity may be treated as a special case of a complex activity where there is only one simple activity. Next, the information is correlated in a correlating step 910. The correlating step 910 may be performed by a fuzzy controller, although rule-based controllers or others may be used. Once the information has been correlated and a distraction level and corresponding confidence level in the distraction level have been determined, the distraction level and corresponding confidence level are outputted 912 in order to facilitate a threat assessment decision by another system or software module. Subsequently, a threat assessment decision is made and equipment parameters (e.g., the parameters controlling a collision warning system) are adjusted 914.

As noted previously, the present invention may be applied in many different situations. A few example situations include systems which incorporate distraction into the operating parameters for heavy equipment, systems which account for operator distraction in assembly lines, and systems for determining distraction in the context of vehicles other than automobiles, such as for use with other terrestrial vehicles such as trucks as well as aircraft and watercraft. The primary requisite for application of the present invention is that there be an indirect distraction measure (e.g. analogous to the use of controls described herein). Conversely, in some situations, the present invention may be adapted to provide a measure of attention.

What is claimed is:

1. A method for calculating an indicator of operator distraction for an equipment operator comprising the following steps:
   receiving distraction-correlated indicator information regarding an operator from devices around an operator;
   estimating a distraction level from the distraction-correlated indicator information; and
   producing an output indicative of the distraction level in order to facilitate a threat assessment decision,
   wherein in the step of producing an output, the output produced ensures that when the distraction of the operator is high, the threat assessment decision is made conservatively,
   wherein the distraction-correlated indicator information is received from at least one device selected from a group comprising vision-based sensing systems, range-finding systems, and operator-manipulated devices,
   wherein the step of estimating a distraction level further comprises the steps of:
   grouping the distraction-correlated indicator information into complex task types comprising sets of related activities, including at least a first activity and a most recent activity;
   determining an elapsed time since a start of the first activity in a complex task;
   determining a delay time since the most recent activity in the complex task;
   comparing the delay time since the most recent activity with a minimum task quiescent period, and when the delay time exceeds the minimum task quiescent period, resetting the elapsed time and the delay time; and
   during a performance of a complex task, correlating a type of the complex task, and the elapsed time of the complex task with the distraction-correlated indicator information in order to produce the output for facilitating the threat assessment decision.

2. A method for calculating an indicator of operator distraction for an equipment operator as set forth in claim 1, wherein in the receiving step, the distraction-correlated indicator information includes a duration of a current activity.

3. A method for calculating an indicator of operator distraction for an equipment operator as set forth in claim 2, wherein the step of correlating is performed by a controller selected from a group consisting of fuzzy rule-based controllers and rule-based controllers.

4. A method for calculating an indicator of operator distraction for an equipment operator as set forth in claim 3, wherein in the step of receiving distraction-correlated indicator information, the distraction-correlated indicator information is based on secondary activities performed by the operator of a vehicle.

5. A method for calculating an indicator of operator distraction for an equipment operator as set forth in claim 4, further comprising a step of adjusting operational parameters of the vehicle to accommodate the operator's distraction.

6. A method for calculating an indicator of operator distraction for an equipment operator as set forth in claim 5, wherein in the step of adjusting the operational parameters, the operational parameters adjusted are collision warning system parameters.

7. A method for calculating an indicator of operator distraction for an equipment operator as set forth in claim 1, wherein in the step of receiving distraction-correlated indicator information, the distraction-correlated indicator information is based on secondary activities performed by the operator of equipment selected from a group consisting of manufacturing equipment and process control equipment.

8. A method for calculating an indicator of operator distraction for an equipment operator as set forth in claim 7, further comprising a step of adjusting operational parameters of the equipment to accommodate the operator's distraction.

9. A method for calculating an indicator of operator distraction for an equipment operator as set forth in claim 1, wherein in the step of receiving distraction-correlated indicator information, the distraction-correlated indicator information is based on secondary activities performed by the operator of a vehicle.

10. A method for calculating an indicator of operator distraction for an equipment operator as set forth in claim 9, further comprising a step of adjusting operational parameters of the vehicle to accommodate the operator's distraction.

11. A method for calculating an indicator of operator distraction for an equipment operator as set forth in claim 10, wherein in the step of adjusting the operational parameters, the operational parameters adjusted are collision warning system parameters.

12. A method for calculating an indicator of operator distraction for an equipment operator as set forth in claim 1, wherein the step of correlating is performed by a controller selected from the group consisting of fuzzy rule-based controllers and rule-based controllers.

13. A method for calculating an indicator of operator distraction for an equipment operator as set forth in claim 1, further comprising a step of producing a second output including a confidence level of the output that is indicative of the distraction level for facilitating a threat assessment decision.

14. An apparatus for calculating an indicator of operator distraction for an equipment operator comprising:
means for receiving distraction-correlated indicator information regarding an operator from devices around an operator;
means for estimating a distraction level from the distraction-correlated indicator information; and
means for producing an output indicative of the distraction level in order to facilitate a threat assessment decision,
wherein in the means for producing an output produces an output that ensures that when the distraction of the operator is high, the threat assessment decision is made conservatively,
wherein the distraction-correlated indicator information is received from at least one device selected from a group comprising vision-based sensing systems, range-finding systems, and operator-manipulated devices,
wherein the means for estimating a distraction level further comprises:
means for grouping the distraction-correlated indicator information into complex task types comprising sets of related activities, including at least a first activity and a most recent activity;
means for determining an elapsed time since a start of the first activity in a complex task;
means for determining a delay time since the most recent activity in the complex task;
means for comparing the delay time since the most recent activity with a minimum task quiescent period, and when the delay time exceeds the minimum task quiescent period, resetting the elapsed time and the delay time; and
means for, during a performance of a complex task, correlating a type of the complex task, and the elapsed time of the complex task with the distraction-correlated indicator information in order to produce the output for facilitating the threat assessment decision.

15. An apparatus for calculating an indicator of operator distraction for an equipment operator as set forth in claim 14, wherein the means for receiving receives distraction-correlated indicator information including a duration of a current activity.

16. An apparatus for calculating an indicator of operator distraction for an equipment operator as set forth in claim 15, wherein the means for correlating operates by use of a controller selected from a group consisting of fuzzy rule-based controllers and rule-based controllers.

17. An apparatus for calculating an indicator of operator distraction for an equipment operator as set forth in claim 16, wherein the means for receiving distraction-correlated indicator information receives distraction-correlated indicator information that is based on secondary activities performed by the operator of a vehicle.

18. An apparatus for calculating an indicator of operator distraction for an equipment operator as set forth in claim 17, further comprising means for adjusting operational parameters of the vehicle to accommodate the operator's distraction.

19. An apparatus for calculating an indicator of operator distraction for an equipment operator as set forth in claim 18, wherein in the means for adjusting the operational parameters adjusts collision warning system parameters.

20. An apparatus for calculating an indicator of operator distraction for an equipment operator as set forth in claim 14, wherein in the means for receiving distraction-correlated indicator information receives distraction-correlated indicator information based on secondary activities performed by the operator of equipment selected from a group consisting of manufacturing equipment and process control equipment.

21. An apparatus for calculating an indicator of operator distraction for an equipment operator as set forth in claim 20, further comprising means for adjusting operational parameters of the equipment to accommodate the operator's distraction.

22. An apparatus for calculating an indicator of operator distraction for an equipment operator as set forth in claim 14, wherein the means for receiving distraction-correlated indicator information receives distraction-correlated indicator information based on secondary activities performed by the operator of a vehicle.

23. An apparatus for calculating an indicator of operator distraction for an equipment operator as set forth in claim 22, further comprising a means for adjusting operational parameters of the vehicle to accommodate the operator's distraction.

24. An apparatus for calculating an indicator of operator distraction for an equipment operator as set forth in claim 23, wherein the means for adjusting the operational parameters adjusts collision warning system parameters.

25. An apparatus for calculating an indicator of operator distraction for an equipment operator as set forth in claim 14, wherein in the means for correlating operates by use of a controller selected from the group consisting of fuzzy rule-based controllers and rule-based controllers.

26. An apparatus for calculating an indicator of operator distraction for an equipment operator as set forth in claim 14, further comprising a means for producing a second output including a confidence level of the output that is indicative of the distraction level for facilitating a threat assessment decision.

27. A computer program product for calculating an indicator of operator distraction for an equipment operator comprising, the computer program product comprising means stored on a computer readable medium for
receiving distraction-correlated indicator information regarding an operator from devices around an operator;
estimating a distraction level from the distraction-correlated indicator information; and
producing an output indicative of the distraction level in order to facilitate a threat assessment decision,
wherein the means for producing an output is configured to produce an output that ensures that when the distraction of the operator is high, the threat assessment decision is made conservatively,
wherein the means for receiving distraction-correlated indicator information is configured for receiving from at least one device selected from a group comprising vision-based sensing systems, range-finding systems, and operator-manipulated devices,
wherein the means for estimating a distraction level further comprises:
means for grouping the distraction-correlated indicator information into complex task types comprising sets of related activities, including at least a first activity and a most recent activity;
means for determining an elapsed time since a start of the first activity in a complex task;
means for determining a delay time since the most recent activity in the complex task;
means for comparing the delay time since the most recent activity with a minimum task quiescent period, and when the delay time exceeds the minimum task quiescent period, resetting the elapsed time and the delay time; and
means for, during the performance of a complex task, correlating a type of the complex task, and the elapsed time of the complex task with the distraction-correlated indicator information in order to produce the output for facilitating the threat assessment decision.

28. A computer program product for calculating an indicator of operator distraction for an equipment operator as set forth in claim 27, wherein the means for receiving is configured to receive distraction-correlated indicator information including a duration of a current activity.

29. A computer program product for calculating an indicator of operator distraction for an equipment operator as set forth in claim 28, wherein the means for correlating is configured to operate by use of a controller selected from the group consisting of fuzzy rule-based controllers and rule-based controllers.

30. A computer program product for calculating an indicator of operator distraction for an equipment operator as set forth in claim 29, wherein the means for receiving distraction-correlated indicator information is configured to receive distraction-correlated indicator information that is based on secondary activities performed by the operator of a vehicle.

31. A computer program product for calculating an indicator of operator distraction for an equipment operator as set forth in claim 30, further comprising, on the computer-readable medium, means for adjusting operational parameters of the vehicle to accommodate the operator's distraction.

32. A computer program product for calculating an indicator of operator distraction for an equipment operator as set forth in claim 31, wherein the means for adjusting the operational parameters is configured to adjust collision warning system parameters.

33. A computer program product for calculating an indicator of operator distraction for an equipment operator as set forth in claim 27, wherein the means for receiving distraction-correlated indicator information is configured to receive distraction-correlated indicator information based on secondary activities performed by the operator of equipment selected from a group consisting of manufacturing equipment and process control equipment.

34. A computer program product for calculating an indicator of operator distraction for an equipment operator as set forth in claim 33, further comprising, on the computer-readable medium, means for adjusting operational parameters of the equipment to accommodate the operator's distraction.

35. A computer program product for calculating an indicator of operator distraction for an equipment operator as set forth in claim 27, wherein the means for receiving distraction-correlated indicator information is configured to receive distraction-correlated indicator information based on secondary activities performed by the operator of a vehicle.

36. A computer program product for calculating an indicator of operator distraction for an equipment operator as set forth in claim 35, further comprising, on the computer-readable medium, means for adjusting operational parameters of the vehicle to accommodate the operator's distraction.

37. A computer program product for calculating an indicator of operator distraction for an equipment operator as set forth in claim 36, wherein the means for adjusting the operational parameters is configured to adjust collision warning system parameters.

38. A computer program product for calculating an indicator of operator distraction for an equipment operator as set forth in claim 27, wherein in the means for correlating is configured to operate by use of a controller selected from the group consisting of fuzzy rule-based controllers and rule-based controllers.

39. A computer program product for calculating an indicator of operator distraction for an equipment operator as set forth in claim 27, further comprising, on the computer-readable medium, a means for producing a second output including a confidence level of the output that is indicative of the distraction level for facilitating a threat assessment decision.

* * * * *

UNITED STATES PATENT AND TRADEMARK OFFICE
CERTIFICATE OF CORRECTION

PATENT NO. : 7,039,551 B2  Page 1 of 1
APPLICATION NO. : 10/256098
DATED : May 2, 2006
INVENTOR(S) : David Shu It is certified that error appears in the above-identified patent and that said Letters Patent is hereby corrected as shown below:

At column 7, line 30:

"$\tau_{(i)}$"

Should read:

-- $\tau^{(i)}$ --

Signed and Sealed this

Twentieth Day of May, 2008

JON W. DUDAS
*Director of the United States Patent and Trademark Office*